United States Patent [19]

Weller

[11] 4,109,951
[45] Aug. 29, 1978

[54] LIGHTWEIGHT BUMPER GUARDS

[75] Inventor: Peter A. Weller, Durham, N.H.

[73] Assignee: McCord Corporation, Detroit, Mich.

[21] Appl. No.: 825,568

[22] Filed: Aug. 18, 1977

[51] Int. Cl.$^2$ ............................................. B60R 19/00
[52] U.S. Cl. ...................................... 293/65; 293/67
[58] Field of Search ...................... 293/60, 64, 65, 66, 293/67, 71 R

[56] References Cited

U.S. PATENT DOCUMENTS

| 2,731,290 | 1/1956 | Corydon | 293/67 |
| 2,798,756 | 7/1957 | Corydon | 293/65 |
| 3,378,296 | 4/1968 | Crocker | 293/65 |
| 3,574,379 | 4/1971 | Jordan | 293/65 |
| 3,610,609 | 10/1971 | Sobel | 293/65 |

Primary Examiner—Trygve M. Blix
Assistant Examiner—D. W. Keen
Attorney, Agent, or Firm—McGlynn and Milton

[57] ABSTRACT

A lightweight bumper guard assembly for a vehicle bumper including a flexible, decorative outer skin member of predetermined shape including a front wall, side walls and upper and lower walls for defining a cavity opening to the rear of the assembly, a core element located within the cavity of the outer skin member for supporting the outer skin member, the core element including a rear surface which generally conforms to the exterior of the vehicle bumper and is adapted to engage the vehicle bumper, the outer skin member including integral flanges extending inwardly across the opening of the cavity and overlapping the core element to hold the skin member tightly to the bumper.

11 Claims, 6 Drawing Figures

LIGHTWEIGHT BUMPER GUARDS

FIELD OF THE INVENTION

This invention relates to a bumper guard assembly for a vehicle bumper.

BACKGROUND OF THE INVENTION

Bumper guard assemblies have long been employed on vehicle bumpers to prevent the bumpers from engaging horizontally disposed objects, such as barriers or bumpers on other automobiles to protect the bumpers from damage. The bumper guards also improve the appearance of the vehicle. Commonly, bumper guards are made of relatively heavy gauge metal stampings which are bolted to the vehicle bumper. Such bumper guards have the disadvantage of weighing 3 to 5 pounds each, thus contributing 12 to 20 pounds to the weight of the vehicle. In view of recent efforts to reduce the weight of passenger vehicles in order to meet federal emissions and gasoline consumption standards, it is desirable to reduce the weight of the bumper guards as much as possible without destroying their usefulness.

PRIOR ART

While the prior art teaches a number of substantially nonmetallic bumper guard assemblies which are lighter than their metal counterparts, apparently few have been accepted by the auto industry. The reasons for this lack of acceptance are no doubt related to the difficulties encountered in fabricating such bumper guards or their external appearance. Such bumper guards are shown in U.S. Pat. Nos. 2,731,290, 2,798,756 and 3,378,296.

SUMMARY OF THE INVENTION

This invention provides a bumper guard assembly which is lightweight, economical to manufacture and has an external appearance very similar to metal bumper guards. More specifically, the bumper guard assembly of the instant invention includes a flexible, decorative outer skin member of predetermined shape including a front wall, side walls, and upper and lower walls for defining a cavity opening to the rear of the assembly. A core element is located within the cavity of the outer skin member for supporting the outer skin member. In other words, the core element prevents the skin member from easily collapsing thereby sustaining its intended configuration. The core element includes a rear surface which generally conforms to the exterior shape of the vehicle bumper and is adapted to engage the vehicle bumper. In other words, the outer skin member does not surround the entire core element, but the rear surface of the core element is exposed for engagement with the bumper. In order to hold the skin member on the bumper, the outer skin member includes integral flanges extending inwardly across the opening of the cavity which overlap the core element. A fastener member is also provided for attaching the assembly to a vehicle bumper such that the flanges on the skin member are captured between the fastener member and the vehicle bumper to maintain the assembly in snug engagement with the vehicle bumper.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
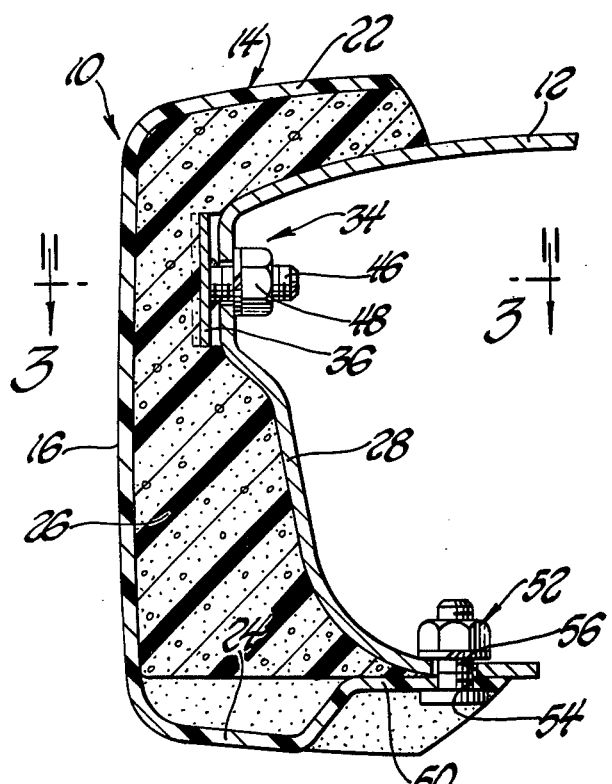
FIG. 1 is a transverse, cross-sectional view of a bumper guard assembly constructed in accordance with the instant invention mounted to a vehicle bumper.
Figure 2:
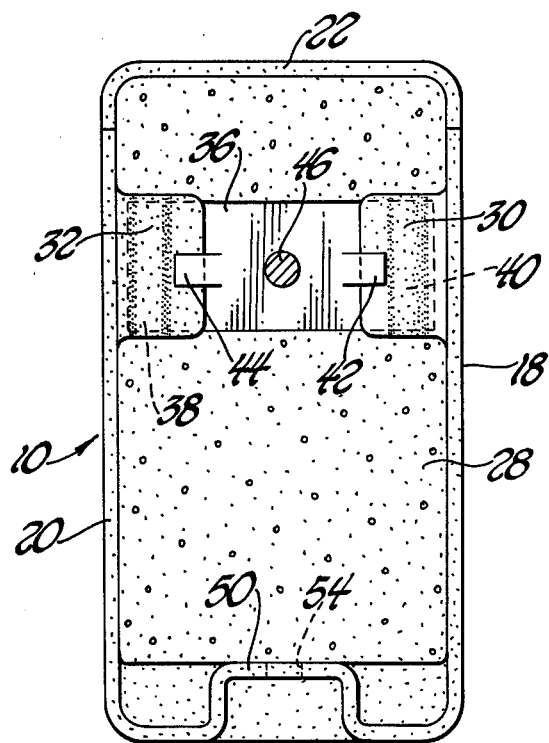
FIG. 2 is a rear elevational view of the bumper guard assembly of FIG. 1.
Figure 3:
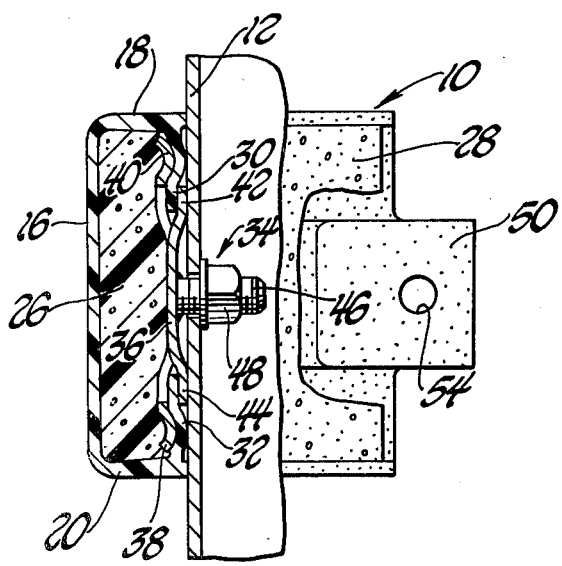
FIG. 3 is a cross-sectional view taken generally along line 3—3 of FIG. 1.

Referring to the drawings, a preferred embodiment of a bumper guard assembly constructed in accordance with the instant invention is generally shown at 10 in FIGS. 1-3.

The bumper guard assembly 10 shown in FIG. 1 is attached to a vehicle bumper 12 and serves the primary function of preventing the bumper from engaging horizontally disposed objects to protect the bumper from damage.

The bumper guard assembly 10 includes a flexible outer skin member generally indicated at 14 of predetermined shape. The outer skin member is essentially decorative in function and may be made of a variety of materials. However, the outer skin member must be capable of recovery after deflection and must resist marring. In short, it must be capable of withstanding minor impacts without damage. The outer skin member may be made of material having integrally molded color, a paintable material or one which can receive a bright finish on either the outside or backside thereof. For example, the outer skin member may be made by an injection molding process using a material such as surlyn or by an automated RIM (reaction injection molding) process using a thermosetting urethane compound.

The flexible outer skin member includes a front wall 16, side walls 18 and 20 and upper and lower walls 22 and 24 respectively. These walls define a cavity opening to the rear of the assembly.

A core element 26 is located within the cavity of the outer skin member 14 to support the outer skin member 14 so that it is not easily collapsible. The core element 26 includes a rear surface 28 which generally conforms to the exterior shape of the vehicle bumper 12. As shown in FIG. 1, the core element 26 is adapted to engage the vehicle bumper 12. In other words, the core element 26 is not entirely surrounded by the outer skin member 14, but includes a rear surface 28 which is exposed and engages the vehicle bumper 12.

In the embodiment of the invention shown in FIGS. 1-3, the core element 26 is molded from one of a variety of foam or honeycomb materials. A suitable material is polyurethane foam. In any event, the core element is made of a material which is relatively lightweight, compressible and recoverable. Depending upon the specific type of material used to form the core element 26 and its density, a variety of hardnesses can be produced to match the functional requirements of the bumper guard assembly. For example, a relatively dense material is employed to produce a hard core element when minimum deflection of the bumper guard assembly is desired. A lower density core element may be used which collapses readily upon impact but has sufficient firmness to sustain the skin member under normal operating conditions. Since the core element comprises the bulk of the volume of the bumper guard assembly, the density of the material used will determine, to a great extent, the weight of the bumper guard assembly. Hence, the material of the core element is an important design consideration in producing a lightweight bumper guard assembly.

In order to attach the outer skin member 14 to the bumper 26, the outer skin member 14 includes integral flanges 30 and 32 which extend inwardly across the opening of the cavity and overlap the core element 26. The flanges 30 and 32, as shown in FIGS. 1-3, are connected to the side walls 18 and 20 of the outer skin member 14.

One method of manufacturing the bumper guard assembly comprises the steps of forming the outer skin member 14 and the core element 26 separately. Thereafter, the core element 26 is inserted into the cavity defined by the outer skin member 14. In order to accomplish this assembly operation, the integral flanges 30 and 32 must be capable of moving out of their position across the opening of the cavity to permit the introduction of the core element 26. Moreover, the integral flanges must be capable of such movement to permit removal of the outer skin member from its mold without causing undue strain. Hence, the integral flanges 30 and 32 are hingedly connected to the outer skin member 14. If the outer skin member 14 is sufficiently flexible, the material itself will provide the hinged connection. For stiffer material, however, the flanges are relieved adjacent its connection to the outer skin member 14. This is shown most clearly in FIG. 5 and will be described more specifically in conjunction with the description of FIGS. 4 and 5.

A primary fastener member, generally shown at 34, is provided for attaching the bumper guard assembly to the vehicle bumper 12. The fastener member 34 is designed to hold the flanges 30 and 32 against the vehicle bumper 12. In other words, the flanges 30 and 32 are captured between the fastener member 34 and the bumper 12. This arrangement insures a snug connection between the bumper guard assembly and the bumper 12.

The fastener member 34 is preferably made of metal, such as steel, for strength purposes and includes a base portion 36 which extends between the core element 26 and the flanges 30 and 32. In other words, the outer ends 38 and 40 of the base portion 36 lie behind the flanges 30 and 32 of the outer skin member 14. The base portion 36 of the fastener member 34 may also include finger-like extensions 42 and 44 which overlie the flanges 30 and 32 to grip the flanges between the extensions 42 and 44 and the base portion 36. If necessary, a connection between the flanges 30 and 32 and the base portion 36 can be provided by forming holes in one of the members and cooperating posts in the other members which are located in the holes.

A fastener post 46 consisting of a threaded stud is attached to the base portion 36 and extends outwardly from the cavity in the outer skin member 14. The fastener post 46 is adapted to extend through a suitably located hole in the bumper 12 where a nut 48 can be threaded onto it.

The outer skin member 14 also includes an integral attachment tab 50 for attachment to the vehicle bumper 12 by means of a suitable nut and bolt fastener, generally indicated at 52, which is received through holes 54 and 56 in the attachment tab 50 and vehicle bumper 12 respectively.

Figure 4:
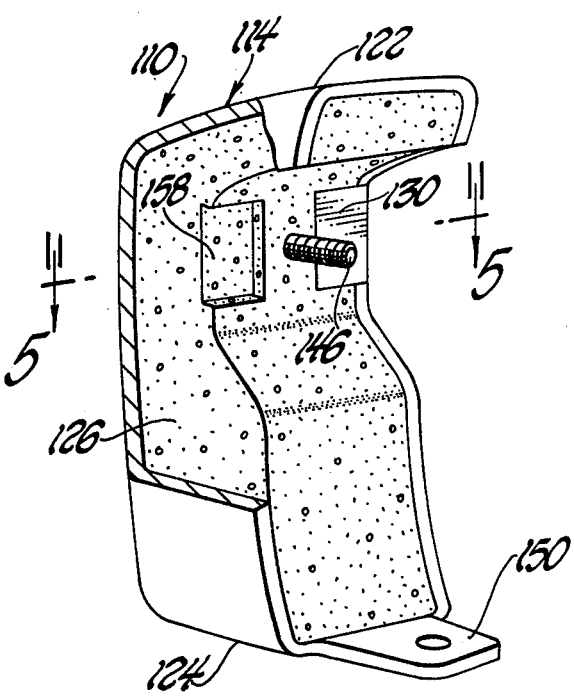
FIG. 4 is a perspective view, partially cut away, of a modified bumper guard assembly constructed in accordance with the instant invention.
Figure 5:
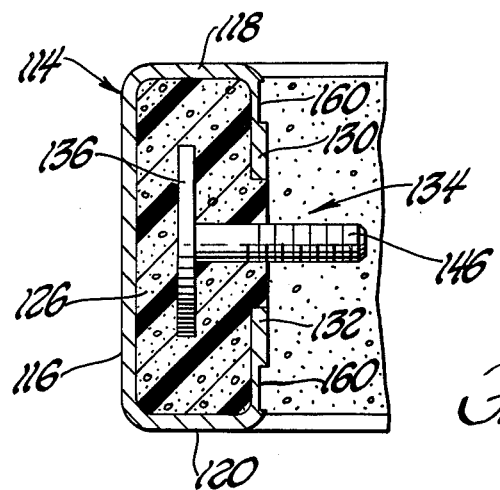
FIG. 5 is a cross-sectional view taken generally along line 5—5 of FIG. 4.

Another embodiment of the bumper guard assembly is shown in FIGS. 4 and 5. In this embodiment the bumper guard assembly, shown generally at 110, includes a flexible decorative outer skin member generally indicated at 114. The bumper guard assembly 110 is substantially the same as the bumper guard assembly 10 shown in FIGS. 1-3. The core element 126 includes recesses 158 for receiving the integral flanges of the outer skin member 114. In FIG. 4, the outer skin member 14 is cut away to expose one of the recesses 158 in the core element 126. The remaining flange 130 is shown located in its recess in the core element 26.

As shown in FIG. 5, a hinged connection between the flanges 130 and 132 and the side walls 118 and 120 of the outer skin member 114 is provided by forming a relieved section 160 in the flange near the sidewall. The relieved sections 160 permits the flanges 130 and 132 to be moved out of the normal position across the opening of the cavity for the reasons noted above.

In the first described embodiment of the bumper guard assembly (FIGS. 1-3), the fastener member 34 constituted a separate element which was assembled to the bumper guard assembly after the core element 26 had been inserted into the outer skin member 14. In this embodiment, the fastener member is molded into the core element 26 as shown in FIG. 5. More specifically, the fastener member, generally indicated at 134, includes a base portion 136 which is embedded in the core element 126. A fastener post 146 connected to the base portion 136 extends out of the core element 126 through the cavity opening for attachment to the vehicle bumper in a manner similar to that described with respect to the first embodiment.

It is noted that the outer skin member of the second embodiment of the bumper guard assembly also includes a front wall 116, upper and lower walls 122 and 124 and an integral attachment tab 150 for attachment to the vehicle bumper. The core element 126 in the second embodiment of the bumper guard assembly is also preferably made of a molded, relatively lightweight compressible and recoverable material.

An alternate method of making the bumper guard assembly is to mold the core element directly into the skin member. In other words, a preproduced skin member is positioned within a mold cavity and the appropriate materials are introduced. The particular material used for the core element will determine the setting and curing procedure. In this method, the fastener member can also be positioned in the mold cavity so that it becomes an integral part of the core element.

Figure 6:
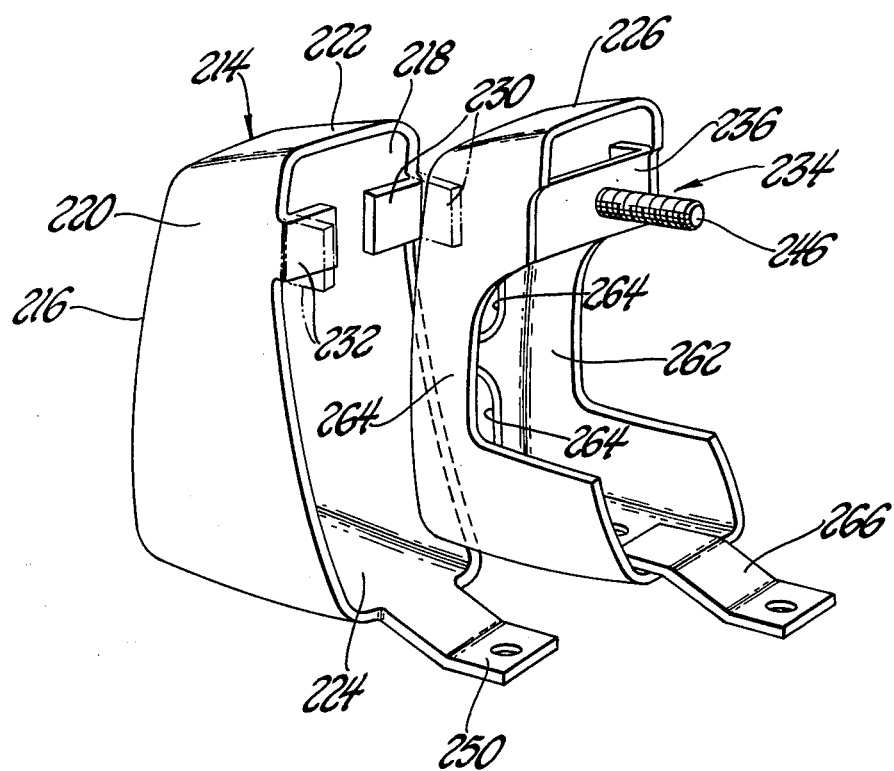
FIG. 6 is an exploded perspective view of another embodiment of a bumper guard assembly constructed in accordance with the instant invention.

In the third embodiment of the bumper guard assembly shown in FIG. 6, the outer skin member, generally indicated at 214, is supported by a core element 226 which is made of a sheet metal stamping. Again, the outer skin member includes a front wall 216, side walls 218 and 220 and upper and lower walls 222 and 224. Integral flanges 230 and 232 are also provided for holding the skin member on the core element.

A fastener member, generally indicated at 234, is provided which includes a base member 236 extending between the side walls 262 and 264 of the core element 226. A fastener post 246 connected to the base portion 236 extends rearwardly through the cavity opening for attachment to a vehicle bumper.

In order to reduce the weight of the bumper guard assembly when a stamped sheet metal core element 226 is employed, one or more lightening holes 264 are formed in the core element 226. Additionally, the side walls 262 and 264 of the core element 226 may be cut away from the rear as shown to further reduce the weight of the core element 226.

In this embodiment, the outer skin member 214 includes an integral attachment tab 250 which overlies a similarly shaped attachment tab 266 on the core element 226. Both of these tabs are attached to the vehicle bumper by means of a suitable fastener assembly. It is to be noted that the attachment tabs 250 and 266 can be eliminated and replaced by a set of flanges similar to the flanges 230 and 232.

In all of the embodiments described above, a lightweight bumper guard assembly is provided which includes a flexible outer skin member which is primarily decorative in function. In other words, the outer skin member defines the external shape and appearance of the bumper guard assembly. The outer skin member is supported by an internal core element which is made of an inexpensive and lightweight material, e.g., polyurethane foam or a sheet metal stamping. These two elements are maintained in an assembled condition by means of the integral flanges on the outer skin member which aids in tightly holding the outer skin member to the bumper. As a result the core element is also held in place. In other words, the flanges help to keep the skin member in place to maintain the physical appearance of the assembly.

The invention has been described in an illustative manner, and it is to be understood that the terminology which has been used is intended to be in the nature of words or description rather than of limitation.

Obviously, many modifications and variations of the present invention are possible in light of the above teachings. It is, therefore, to be understood that the invention may be practiced otherwise than as specifically described herein and yet remain within the scope of the appended claims.

The embodiments of the invention in which an exclusive property or privilege is claimed are defined as follows:

1. A bumper guard assembly for a vehicle bumper comprising; a flexible, decorative outer skin member of predetermined shape including a front wall, side walls and upper and lower walls for defining a cavity opening to the rear of the assembly; a core element located within the cavity of said outer skin member for supporting said outer skin member so that it is not easily collapsible, said core element including a rear surface generally conforms to the exterior of the vehicle bumper and is adapted to engage the vehicle bumper; said outer skin member including integral flanges extending inwardly across the opening of the cavity and overlapping said core element to hold said outer skin member on said core element; and a fastener member for attaching the assembly to a vehicle bumper such that said flanges are captured between said fastener member and the vehicle bumper.

2. An assembly as set forth in claim 1 wherein said outer skin member includes at least one integral attachment tab for attachment to the vehicle bumper.

3. An assembly as set forth in claim 1 wherein said outer skin member includes an integral attachment tab connected to said lower wall for attachment to the vehicle bumper.

4. An assembly as set forth in claim 1 wherein said fastener member includes a base portion and a fastener post extending outwardly from the cavity, said base portion extending between said core element and said flanges.

5. An assembly as set forth in claim 4 wherein said base portion of said fastener member includes an extension for overlying each of said flanges to grip each of said flanges between said extension and said base portion.

6. An assembly as set forth in claim 5 wherein said core element is made of a relatively lightweight, compressible and recoverable material.

7. An assembly as set forth in claim 1 wherein said core element includes recesses in the rear surface thereof for receiving said flanges.

8. An assembly as set forth in claim 1 wherein said fastener member includes a base portion embeddded in said core element and a fastener post extending out of said core element.

9. An assembly as set forth in claim 1 wherein said core element includes a sheet metal stamping having an external shape adapted to support said outer skin member in a predetermined configuration.

10. An assembly as set forth in claim 9 wherein said fastener member includes a base member attached to said core element and a fastener post extending rearwardly from said core element.

11. An assembly as set forth in claim 9 wherein said core element includes at least one lightening hole for reducing the weight of said assembly.

* * * * *